United States Patent [19]
Richardson

[11] Patent Number: 5,924,924
[45] Date of Patent: Jul. 20, 1999

[54] VENTILATION MONITORING, CONTROL AND ALARM SYSTEM FOR LIVESTOCK BUILDINGS

[76] Inventor: Robert H. Richardson, 208 Sylvan Dr., Hayesville, N.C. 28904

[21] Appl. No.: 08/992,799

[22] Filed: Dec. 18, 1997

[51] Int. Cl.$^6$ .................................................. A01K 31/18
[52] U.S. Cl. ......................................... 454/256; 119/448
[58] Field of Search .................................... 454/239, 256, 454/258; 119/437, 448; 160/6; 236/49.3

[56] References Cited

U.S. PATENT DOCUMENTS

| | | |
|---|---|---|
| 3,429,298 | 2/1969 | Thomason . |
| 3,915,377 | 10/1975 | Sutton . |
| 4,428,278 | 1/1984 | Sutton, Jr. . |
| 4,605,162 | 8/1986 | Crider . |
| 5,205,785 | 4/1993 | Richardson ............................ 454/256 |
| 5,325,813 | 7/1994 | Sutton, Jr. ............................ 454/239 X |

Primary Examiner—Harold Joyce

[57] ABSTRACT

Normally closed ventilating elements of a livestock building or the like are opened in response to failure of the supply of electrical power to the building ventilating system, an undesired increased temperature within the building or other undesireable conditions such as the inadvertent opening of one or more of the ventilating elements by a control system which includes a source of direct current electricity arranged so as normallly to energize electromagnets and thereby secure their armatures to the electromagnets. The armatures are secured to the handles of winches which are arranged to operate the building curtains or louvers. Power to the electromagnets is controlled through a semiconductor device acting as a switch which is controlled by monitoring circuits and a time delay network. When a response is required the control system deenergizes the electromagnets so as to free their armatures to rotate with the winch handles to open the building emergency ventilating elements. An automatic means is also provided to notify maintenance personnel when a problem occurs.

10 Claims, 3 Drawing Sheets

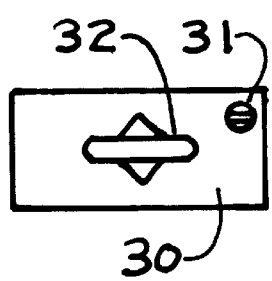
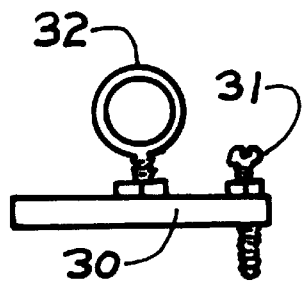
FIG. 2 a  FIG. 2 b
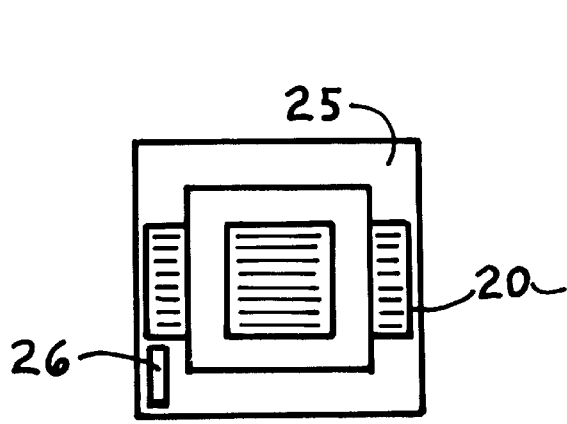
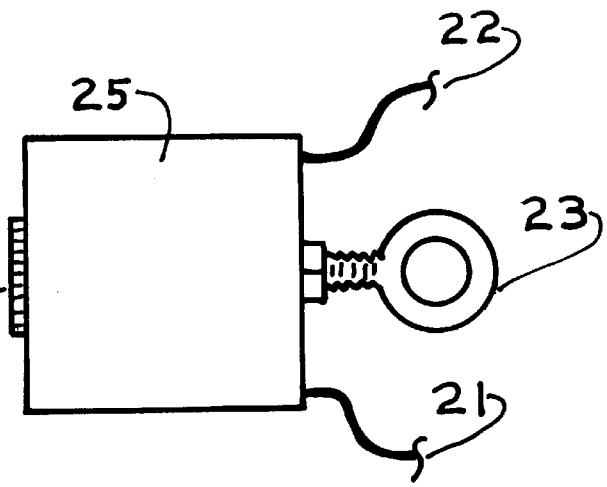
FIG. 3 a  FIG. 3 b
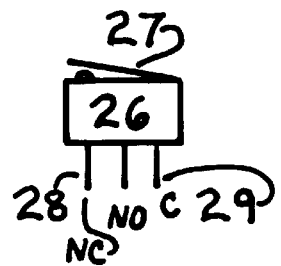
FIG. 3 c

VENTILATION MONITORING, CONTROL AND ALARM SYSTEM FOR LIVESTOCK BUILDINGS

TECHNICAL FIELD

This invention relates to an improved apparatus for monitoring and controlling the emergency ventilation means in a poultry or livestock confinement building and for rapidly notifing maintenance personnel when problems occur in these systems.

BACKGROUND

Poultry and livestock are often confined in houses specifically designed to contain them while they are grown to marketable size. Some of these houses have large screened openings in the walls that are typically covered with heavy fiberglass curtains that can be automatically or manually opened when necessary to provide adequate ventilation and control the temperature for the animals. During normal operations the curtains are closed and electric ventilating fans are used to contantly remove the carbon dioxide and heat generated by the animals and continuously provide the fresh air necessary for the animals good health. The curtains are partially opened and closed as necessary to maintain the proper temperature for the animals. A power failure in the electric ventilation fans or an unusual increase in the inside temperature must be promptly detected and the alternate emergency ventilation system automatically activated which usually consists of instantly opening all of the curtains. Cross ventilation through the screened openings will then provide emergency ventilation for the animals.

The quicker the problem is solved the less stress on the animals, therefore it is imperative to quickly notify the maintenance personnel whenever a problem occurs.

In the newer poultry and animal confinement houses the curtains are maintained closed and in some houses are even replaced with solid louver pan33s that are maintained closed. Air is constantly drawn through the "tunnel house" and temperature is controlled by heaters or by dripping water through filter panels or spraying a fine mist for cooling. In the tunnel house, air flow must be maintained evenly throughout the house. When power is lost and emergency ventilation is called for, all the curtains or the louvers must be opened at the same time. Even if power is not out and one of the curtains or a louver inadvertently opens, this condition must be instantly sensed and all the curtains or louvers opened instantly to prevent the shunting effects of the air flow that will cause disasterous effects on the animals. Maintenance personnel must also be notified immediately to correct the problem.

Several prior patents disclose various methods and devices for automatically opening the curtains during an emergency. For example, U.S. Pat. No. 3,429,298 issued Feb. 25, 1969 discloses a poultry house and an associated curtain raiser which includes an electric motor controlled by a relay, a thermostat and a timer to operate the building curtains through a system of controlled cables. U.S. Pat. No. 3,915,377 discloses a device which, upon the occurrence of a power failure, activates a circuit containing a battery which heats a nichrome wire. A nylon cord extends from the apparatus which holds the curtains in a raised position and passes closely adjacent to the nichrome wire which burns through the cord, releases the curtains and allows them to drop, thus providing emergency ventilation. U.S. Pat. No. 4,605,162 discloses a bimetal strip mounted to a mechanical arm and inserted into a power resistor used as a heater. In arrangements of this type, the time delay following power failure cannot be determined with any degree of accuracy and the energy required is substantial.

U.S. Pat. No. 5,205,785 to the present applicant discloses a unique concept for controlling the normally closed ventilating means in a poultry building or the like in response to a power failure in the building ventilating system. In the utilization of devices manufactured to the specifications disclosed in the above patents I have developed several improvements that are herein disclosed.

None of the above patents addressed the problem of the air flow being shunted in a tunnel ventilated building, the need for an over temperature sensor such as a thermostat, the need to supply a regulated voltage to maintain the charge on the battery, the control of more than one curtain or louver with a single electronic unit, nor the need to immediately notify maintenance personnel whenever a problem occurs. The invention described herein addresses these problems and provides a system where more than one curtain or louver can be monitored and controlled by a single electronic unit that reliabily releases the ventilation means upon a power failure, an out of tolerance temperature condition or the accidental opening of any one of the controlled curtains or louvers, and provides a regulated charging voltage to the battery, and provides a means to automatically send an alarm to notify maintenance personnel upon the sensing of any problem.

SUMMARY OF THE INVENTION

According to this invention in one form, the operating handle of the winch used to operate ventilating curtains or louvers is arranged with its handle physically connected to the armature of an electromagnet. One or more latching units that contain electromagnets are connected in parallel and they are energized from a source of direct electric current through circuit elements including a MOSFET operated as a switch. The gate of the MOSFET is arranged in parallel with a capacitor and resistors so that upon the occurrance of a power failure the capacitor is slowly discharged through a large resistor and upon the occurrance of an inadvertent release of one or more of the curtains or louvers the capacitor is rapidly discharged through a small resistor. As the capacitor is discharged, the drain to source resistance of the MOSFET is increased. At a predetermined point proportional to the product of the resistance of the resistor and the capacitance of the capacitor the MOSFET is switched off to deenergize the electromagnets and to release their armatures which in turn allows the winch handles to rotate and open the curtains or louvers.

A direct current siren and a direct current relay coil are energized through a second MOSFET also operated as a switch. The gate of this second MOSFET is connected to the drain of the first MOSFET so that when the first MOSFET switches off the second is switched on which activates the relay and energizes the siren.

A microswitch is included as a rigid part of the latching unit and placed to sense the position of the armature. When the armature is properly attached to the face of the electromagnet, a part of the armature makes physical contact with the microswitch and opens the normally closed contacts of the microswitch. These contacts are connected through circuit elements to the gate of the first MOSFET so that release or misalignment of any of the armatures in the system will cause the first MOSFET to switch off and release all the armatures in the system thus allowing all the winch handles to rotate and open all the curtains or louvers and activate the relay and energize the siren.

BRIEF DESCRIPTION OF THE DRAWINGS

In the drawings, FIGS. 2a and 2b show the improved armature which is secured to the winch handle and is held by an electromagnetic device; FIGS. 3a and 3b show the improved latching unit which contains the electromagnet and the microswitch sensor; FIG. 3c shows the microswitch sensor with its moveable lever arm.

BEST MODE FOR CARRYING OUT THE INVENTION

Figure 1:
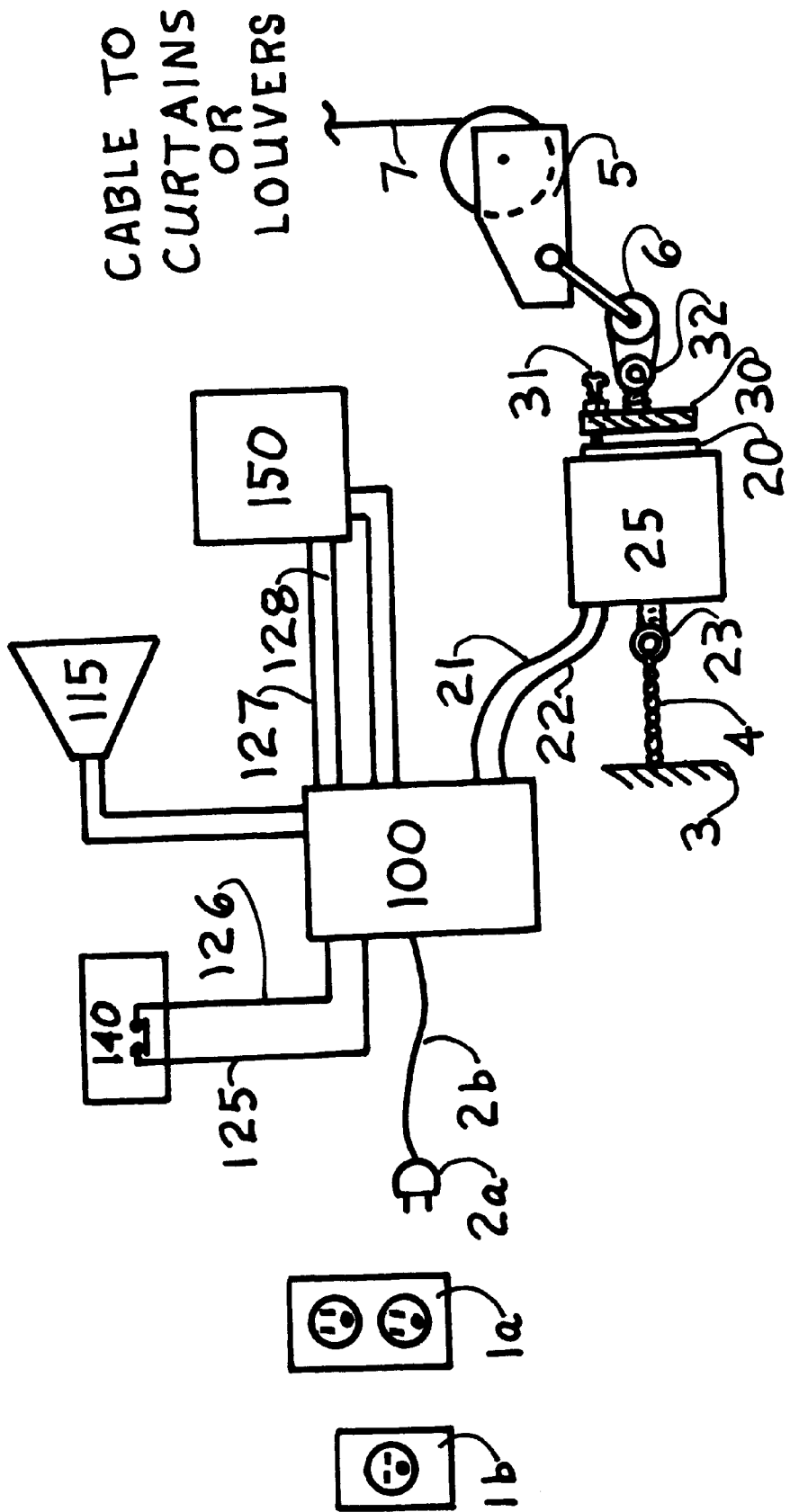
FIG. 1 is a schematic representation of the elements of the invention which monitors the system status and controls the winches and their associated cables arranged to control the curtains or louvers not shown.

In the drawings the numeral 100 designates the electronic monitor and control unit as further described below. The electronic unit 100 may be energized from an electrical outlet either from a source of 120 VAC 1a or from a source of 230 VAC 1b through electrical plug 2a and conductor 2b. The electronic unit 100 converts the source of AC power into the 12 VDC electric current needed by the electromagnets 20 to magnetically hold the armatures 30 which are physically attached to the handles 6 of winches 5 by eyebolts 32. A two wire conductor 21 electrically connects the electronic unit 100 to the electromagnet 20 coil. The electromagnet 20 is physically contained in the latching unit module 25 as shown in FIGS. 3a and 3b. Another two wire conductor 22 connects the electronic unit 100 to the common contact 29 and normally closed contact 28 of the microswitch sensor 26. The lever arm 27 activator on the microswitch sensor 26 is depressed by the position monitor screw 31 mounted on the armature 30 whenever the armature 30 is properly placed onto the face of the electromagnet 20. The microswitch sensor 26 is physically mounted in the latching unit 25 as shown in FIG. 3a. An eyebolt 23 is attached to the side of the latching unit 25 opposite the face of the electromagnet 20 so the latching unit 25 can be securely attached by a short chain 4 to the wall 3 of the confinement building. This use of remote latching units 25 is a clear advantage over previous disclosures. Multiple latching units 25 can be monitored and controlled by a single electronic unit 100.

When direct current is supplied from the electronic unit 100 to the electromagnets 20, the magnetic force created will hold the armatures 30 securely to the face of the electromagnets 20, force down the lever arms 27 of the microswitch sensors 26 and cause the normally closed contacts 28 to open and, because the armatures 30 are securely fastened to the handles 6 of winches 5, the curtains or louvers are securely held in their closed position by cables 7. The electronic unit 100 monitors the condition of the microswitches 26 to determine the status of the curtains or louvers. Generally several latching units 25 and thus several curtains or louvers are monitored and controlled by a single electronic unit 100.

The armature 30 disclosed herein is improved over that disclosed in U.S. Pat. No. 5,205,785 by changing the configuration from an "L" shape to a "T" shape as shown in FIGS. 2a and 2b, and adding the position monitoring screw 31. The "T" configuration increases the holding force by changing the pull on the electromagnet 20 to an evenly distributed force and thus allowing a heavier curtain or louver to be controlled more reliably. The addition of the adjustable position monitoring screw 31 allows the electronic unit 100 to monitor the position of the armature 30.

The normally closed contacts 28 of the microswitch sensors 26 from several latching units 25 are connected in parallel to the electronic unit 100 thus the misposition of any one of the armatures 30 will cause release of all the others.

Figure 4:
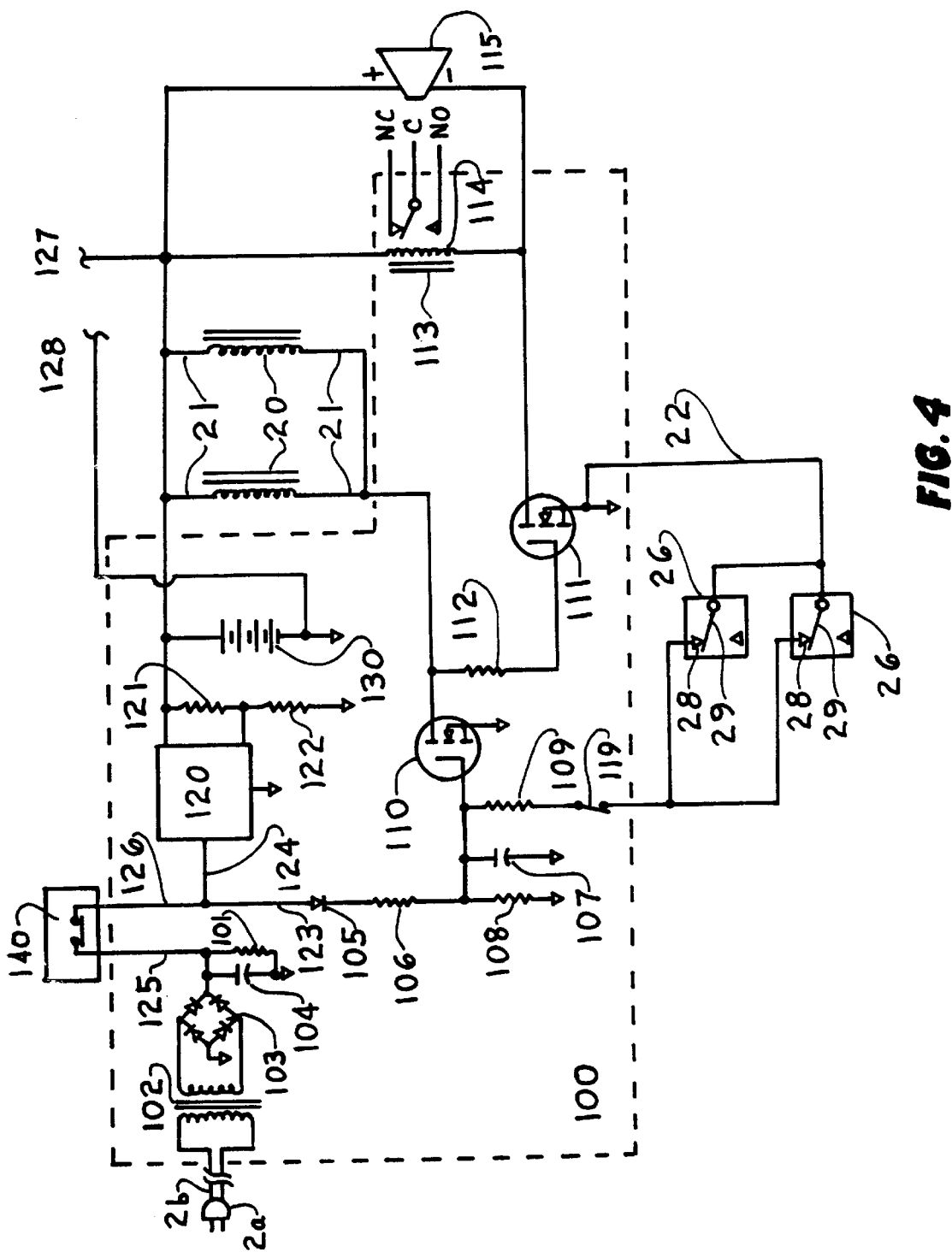
FIG. 4 is a system wiring diagram showing the details of the electric components provided according to the improvements of this invention.

Under normal operating conditions with the emergency ventilation means held closed, the electromagnets 20 are energized by direct current from the electronic unit 100 through conductors 21, and the normally closed contacts 28 of microswitch sensor 26 are held open by the position monitor screw 31 on each of the armatures 30, and the status is monitored by the electronic unit 100 through conductors 22. FIG. 4 is a schematic diagram of a suitable electronic unit 100 which performs the functions delineated below including providing for outputs to alarm devices such as a siren 300 and an automatic dialer/pager 400.

The power source at 1a or 1b is usually the same source as is supplied to the ventilation fans in the building. This is the power source to be monitored by the electronic unit 100. The AC power is routed through a suitable plug 2a and conductor 2b to a step down transformer 102 in the electronic unit 100. This transformer is typically an EWC Inc. model A41-25-12A7 which gives a 12.6 VAC at 2 Amps output. The input voltage is reduced to 12.6 VAC by this transformer 102. The low voltage output from the transformer 102 drives a bridge rectifier 103 to produce a pulsating direct current. A capacitor 104 that is typically 4700 uf smooths this pulsating direct current into a steady direct current. This steady direct current is routed through conductor 125 to the normally closed contacts of a thermostat 140. The thermostat 140 monitors the temperature within the confinement building and will open if the temperature exceeds a predetermined level. Conductors 125 and 126 can be small gauge wire such as 20 AWG becuse the maximum direct current necessary to energize the electromagnets 20 is very low. The thermostat 140 can be an inexpensive low voltage, low current type because the voltage to be switched is less than 20 VDC and the current is typically less than one ampere. A resistor 101 discharges capacitor 104 when power is lost.

Conductor 126 conducts the low voltage direct current from the thermostat 140 back to the electronic unit 100 where it goes two ways. Path 123 is to a diode 105 that prevents the discharge of capacitor 107 when the input source is removed. The direct current then goes through resistor 106 to a parallel network consisting of resistor 108, capacitor 107, the gate of MOSFET 110, and resistor 109 that is in series with the normally closed contacts 28 of all the microswitches 26, and a toggle switch 119 to system ground. When the armature 30 is properly placed onto the face of the electromagnet 20, these normally closed contacts 28 are all held open and in a non-conducting state.

Capacitor 107 is charged to the direct current voltage by the direct current through diode 105 and resistor 106. Resistor 106 is typically 1 to 5K, capacitor 107 is 33 uf and resistor 108 is 0.5 to 6 meg. The product of the resistance of resistor 108 and the capacitance of capacitor 107 is a proportional to the time that the gate of the MOSFET switch 110 will remain above threshold and thus the time that the MOSFET switch 110 will remain in the conducting state after AC power is lost or the thermostat 140 exceeds the predetermined temperature. The MOSFET 110 which acts like a switch in this circuit will conduct current whenever its gate voltage is above the threshold for the device. This is typically 2 to 3 VDC. As long as the input source power is present, the thermostat 140 is below its preset temperature, and the armatures 30 are all in their proper place on the electromagnets 20, the direct current through diode 105 and resistor 106 will maintain the voltage across capacitor 107 and the gate of the MOSFET 110 above the conduction threshold of the MOSFET 110.

The direct current from the bridge rectifier 103, filter capacitor 104, and through thermostat 140 also goes by path 124 to a low dropout voltage regulator 120 such as a LT1529CT by Linear Technology. This voltage regulator 120 maintains a constant voltage at its output over a wide range of input voltage. This is a state-of-the-art device that was not readily available when previous disclosures were made. This device will maintain a regulated output of 13.3 VDC with an input as low as 13.8 VDC which is necessary when operating with the wide voltage swings encountered in agricultural environments. This regulated voltage provides a significant improvement over previous disclosures in that the gel cel type battery 130 will be maintained at a fixed charge level of 13.3 VDC. The unregulated charging voltages in previous disclosures often either over or under charged the battery which reduced its reliability and often destroyed the batteries. Resistors 121 and 122 are selected to fix the voltage regulator 120 output at 13.3 VDC and are 51.1K and 20K respectively.

The voltage regulator 120 output provides charging current for the battery 130 and also the direct current to energize the electromagnets 20 of the latching units 25 by conductors 21. All of the electromagnets 20 to be energized by an electronic unit 100 are connected in parallel and are supplied by the regulated output from the low dropout regulator 120. Because this output is at a regulated voltage, one or more electromagnets 20 can be connected to the same electronic unit 100. This is not possible with previous disclosures. Typical use is 1, 2 or 4 electromagnets 20 for each electronic unit 100.

The direct current goes through the electromagnets 20 to the drain of the MOSFET switch 110. When the MOSFET 110 is in the conducting state, the direct current flows through the electromagnets 20 creating the magnetic field that holds the armatures 30 and thus the winch handle 6 and maintains the curtains or louvers in their normally closed position.

When the MOSFET switch 110 is in its conducting state, the drain to source resistance is very low and the voltage at the drain is near zero. The drain of the MOSFET switch 110 is tied through a 100K resistor 112 to the gate of another MOSFET switch 111. This MOSFET 111 will remain in the non-conducting state as long as its gate is below the conduction threshold of 2 to 3 volts. The drain of this MOSFET 111 is connected to one lead of the coil 114 of a relay 113 and the negative lead (−) of a self contained siren 115. The other lead of the relay coil 114 and the positive (+) lead of the siren 115 are connected to the output of the voltage regulator 120 and the positive terminal of the battery 130. When the MOSFET 111 is not conducting there can be no direct current through the relay coil 114 nor the siren 115. Neither the relay 113 nor the siren 115 will be active under these conditions which are the normal operting conditions for the system.

The parameters being monitored by the electronic unit 100 are the input power source 1a or 1b, the temperature in the confinement building by a thermostat 140, and the position of each of the armatures 30 as related to the corresponding electromagnets 20. Loss of input AC power or a high temperature condition at the thermostat 140 both produce the same results. With the direct current cut off from the input to the voltage regulator 120, the direct current to the electromagnets 20 is provided by the battery 130. The battery 130 will continue to provide operating current as long as the MOSFET switch 110 is on. This MOSFET switch 110 will remain in the conducting state until its gate voltage drops below the threshold at which time it will switch to the off state. The voltage on the gate of this MOSFET switch 110 will drop below this threshold when capacitor 107 discharges sufficiently through resistor 106, typically 2 min.

When the MOSFET 110 switches to the non-conducting state, the voltage on its drain goes to the battery 130 voltage and the voltage on the gate of MOSFET 111 rises above its threshold and MOSFET 111 switches to the conducting state and direct current will flow through the relay coil 114 and activate this relay 113 and through the siren 115 which will activate it.

A regulated 13.3 VDC voltage is available through conductors 127 and 128 to power an external automatic phone dialer/pager 150 or for power to an external alarm system as desired. The contacts of relay 113 provide the necessary activation signal to the dialer/pager 150 or the external alarm system. These provisions for an added dialer/pager 150 and the output for a self contained siren 115 are obvious improvements to previous disclosures.

The position of the armature 30 is monitored by the microswitch sensor 26 mounted in each of the latching units 25. When the lever arm 27 of the microswitch sensor 26 is depressed by the position monitor screw 31 on the armature 30, the normally closed contacts 28 of the microswitch sensor 26 open. This is the normal operating condition for the system. If an armature 30 of any attached electromagnet 20 is in other than its proper position on the face of the electromagnet 20, the lever arm 27 of the microswitch sensor 26 is released and the normally closed contacts 28 close and go to zero resistance. The charge on capacitor 107 and thus the voltage on the gate of the MOSFET switch 110 is then reduced very quickly, less than 5 seconds, as the capacitor 107 is discharged through a resistor 109 of 100 to 200 ohms to ground. Toggle switch 119 is moved to its open or off position to allow set up of the latching units 25, then to its closed or on position to monitor the proper positioning of all the armatures 30 on the associated electromagnets 20 to be monitored and controlled by the electronic unit 100.

This rapid reduction in the voltage on the gate of the MOSFET 110 causes it to switch off thus stopping the direct current through the electromagnets 20 and releasing all the armatures 30 connected to that electronic unit 100.

The siren 115 and the relay 113 will be activated as in the first emergency situation. There is no delay in these actions as there was with loss of AC power or an over temperature problem.

The components of the latching unit 25 are sealed in epoxy and the electromagnet 20 is coated and sealed so that temperatures, moisture, dust etc. have no effect on the operational characteristics. These latching units 25 can therefore be remotely located with the winches 5 as necessary. According to this invention a single electronic unit 100 can monitor and control one or more remotely located latching units 25. In a typical livestock confinement building four curtains or louvers are used as emergency ventilation means. One electronic unit 100 monitoring and controlling four latching units 25 is therefore sufficient for this typical operation. The system described above will reliably monitor the presence of the ventilation fan power as well as other desired parameters such as temperature and curtain status and respond within a predetermined time to release the emergency ventilation system and notify maintenance personnel of the problem.

The voltages present throughout the electronics and to the thermostat 140 is less than 20 VDC and the voltage to each latching unit 25 is about 13 VDC. Therefore there is no danger to personnel or animals. The latching units 25 require about 0.16 ampere so the total power required for operation is about 2 watts per latching unit 25. A typical confinement building with four curtains or louvers and four winches 5 requires less than 10 watts total power for operation.

According to this invention a safe, reliable, low power, low voltage, failsafe, antifouling means for monitoring and controlling the mechanical emergency ventilation means in a livestock confinement building that also automatically sends an alarm to notify maintenance personnel upon a failure is provided.

Although the description above contains many specifications, these should not be construed as limiting the scope of the invention but merely providing illustrations of the presently preferred embodiments of the invention.

In particular, it is to be understood that the invention is not limited to the specific embodiment wire configuration, electronic circuitry, particular semiconductors, voltages, timing, or to the numerical values employed in describing this invention. Furthermore, many other types of components may be employed in practicing the invention in place of those which have been specifically described.

I claim:

1. In a poultry or livestock confinement building having multiple normally closed curtains or louvers as an emergency ventilation means where the loss of ventilation fan power or the inadvertant release of any one or more said curtains or louvers can cause suffocation of the animals very quickly, a device for monitoring the status of each said curtain or louver and opening entire said emergency ventilation means rapidly in response to any problem, said device comprising a voltage regulator for supplying regulated current to maintain a proper charge in an internal battery and to energize multiple electromagnets arranged so that when energized to engage and hold associated armatures arranged to hold associated winches whose cables hold associated said curtains or louvers in their normally closed positions and release said armatures said winches and thus said curtains or louvers when deenergized, circuit means to monitor the status of said armatures on said electromagnet thereby releasing said emergency ventilation means if any one said armature is inadvertly mispositioned thus preventing suffocation of the poultry or livestock housed therein.

2. A device according to claim 1 wherein the status of said curtains or louvers is determined by the position of said armature with respect to said electromagnet wherein when properly located said armature depresses the lever arm of a microswitch mounted in a common housing with said electromagnet.

3. A device according to claim 2 wherein said armature incorporates an adjustable position monitor protrusion to react with and depress said lever arm of said microswitch whenever said armature is properly placed on said electromagnet and release said lever arm whenever said armature is not properly placed on said electromagnet.

4. A device according to claim 1 wherein electronic circuitry responds to the release of said lever arm of said microswitch by instantly removing the energizing current from all said electromagnets associated with said device.

5. A device according to claim 4 wherein said electronic circuitry will provide an activation signal to activate a self contained siren and external alarm devices upon the interruption of said energizing current.

6. A device according to claim 1 wherein said electromagnet and said microswitch are mounted in a housing to protect them from the harsh environment and allow multiple said electromagnets and said microswitches to be located close to said winches and remotely monitored and controlled by a single said electronic circuit means.

7. A device according to claim 1 wherein the current to energize one or more said remote electromagnets is supplied by electronic circuit means that includes a semiconductor low dropout voltage regulator.

8. A device according to claim 7 wherein said low dropout voltage regulator produces a constant voltage output with an input 0.5V or more above desired said output and sufficient output current to energize up to four said electromagnets electrically connected in parallel at said constant voltage.

9. A device according to claim 7 wherein said regulator will supply sufficient current at said constant voltage to maintain a constant charge in an internal battery.

10. A device according to claim 1 wherein said battery is sufficent to provide power to operate an external self contained siren and other external alarm devices.

\* \* \* \* \*